United States Patent
Laing et al.

(10) Patent No.: US 12,229,138 B2
(45) Date of Patent: Feb. 18, 2025

(54) DATA PREPROCESSING SYSTEM MODULE USED TO IMPROVE PREDICTIVE ENGINE ACCURACY

(71) Applicant: Halliburton Energy Services, Inc., Houston, TX (US)

(72) Inventors: Moray Lamond Laing, Spring, TX (US); Mahdi Parak, Katy, TX (US); Nazaad Baksh, Conroe, TX (US); Andreas G. Sadlier, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1079 days.

(21) Appl. No.: 17/123,200

(22) Filed: Dec. 16, 2020

(65) Prior Publication Data

US 2022/0188675 A1 Jun. 16, 2022

(51) Int. Cl.
*G06F 16/00* (2019.01)
*G06F 16/2455* (2019.01)
(Continued)

(52) U.S. Cl.
CPC ...... *G06F 16/2455* (2019.01); *G06F 18/2321* (2023.01); *G06N 20/00* (2019.01);
(Continued)

(58) Field of Classification Search
CPC ............. G06F 16/2455; G06F 16/2462; G06F 16/35; G06F 16/954; G06F 18/15;
(Continued)

(56) References Cited

U.S. PATENT DOCUMENTS

| 8,121,971 B2 | 2/2012 | Edwards et al. |
| 2004/0138933 A1* | 7/2004 | LaComb .......... G06Q 10/06393 |
| | | 705/7.41 |

(Continued)

FOREIGN PATENT DOCUMENTS

| KR | 10-2015-0118340 A | 10/2015 |
| WO | 2019-178240 A1 | 9/2019 |

OTHER PUBLICATIONS

International Search Report and Written Opinion date mailed Sep. 10, 2021; International PCT Application No. PCT/US2020/065937.
International Search Report and Written Opinion date mailed Oct. 6, 2021; International PCT Application No. PCT/US2021/039823.

*Primary Examiner* — Diedra McQuitery
(74) *Attorney, Agent, or Firm* — Barnes & Thornburg, LLP (57) ABSTRACT

An apparatus used to provide preprocessed variables to a predictive engine. The predictive engine generates predictive results, based on the variables, to automate well site operations. The apparatus comprises an analysis module, a pattern recognition module, and a library module. The analysis module identifies a well site operation by examining a well site operation variable, determines categories and standard operating procedures associated with the categories using the well site operation and a-priori information, and searches a library of historical information using the categories. The historical information comprising classified procedures and recommendations of historic well site operations. The pattern recognition module identifies a pattern using a statistics based algorithm. The algorithm uses the standard operating procedures, the categories, and the classified procedures and recommendations. The pattern indicating a deviation in the standard operating procedure. The library module classifies the well site operation variables and stores the classified variables.

27 Claims, 4 Drawing Sheets

(51) Int. Cl.
*G06F 18/2321* (2023.01)
*G06N 20/00* (2019.01)
*G06F 16/2458* (2019.01)
*G06F 16/35* (2019.01)
*G06F 16/954* (2019.01)
*G06F 17/18* (2006.01)
*G06F 18/15* (2023.01)

(52) U.S. Cl.
CPC .......... *G06F 16/2462* (2019.01); *G06F 16/35* (2019.01); *G06F 16/954* (2019.01); *G06F 17/18* (2013.01); *G06F 18/15* (2023.01)

(58) Field of Classification Search
CPC .... G06F 18/214; G06F 18/2321; G06F 17/18; G06N 20/00; G06Q 10/0631; G06Q 10/0635; E21B 2200/22
See application file for complete search history.

(56) References Cited

U.S. PATENT DOCUMENTS

| | | |
|---|---|---|
| 2004/0182574 A1 | 9/2004 | Adnan et al. |
| 2009/0132458 A1 | 5/2009 | Edwards et al. |
| 2012/0123756 A1 | 5/2012 | Wang et al. |
| 2014/0067353 A1 | 3/2014 | Shelley et al. |
| 2014/0351183 A1 | 11/2014 | Germain et al. |
| 2014/0353033 A1 | 12/2014 | Pink et al. |
| 2015/0148919 A1 | 5/2015 | Watson |
| 2015/0369014 A1 | 12/2015 | Weatherhead et al. |
| 2016/0053604 A1 | 2/2016 | Abbassian et al. |
| 2018/0114381 A1* | 4/2018 | Hiemer ..................... E02F 9/26 |
| 2020/0141225 A1* | 5/2020 | Aniket .................... E21B 47/00 |
| 2020/0157922 A1 | 5/2020 | Stout et al. |
| 2021/0011194 A1* | 1/2021 | Guan ....................... G06F 30/20 |
| 2021/0097077 A1* | 4/2021 | Rogers ............. G06F 16/24542 |
| 2022/0076174 A1* | 3/2022 | AlAbdulkarim ....... G06Q 50/04 |

\* cited by examiner

DATA PREPROCESSING SYSTEM MODULE USED TO IMPROVE PREDICTIVE ENGINE ACCURACY

BACKGROUND

As the oil and gas drilling industry move away from manual onsite management and control of well site operations to automated management and control of well site operations, research and development efforts of statistics based and Artificial Intelligence (AI) based management and control solutions used to accurately manage and control well site operations are increasing as demand for these solutions increases. Advantages of automating well site operations include safer operating conditions, a reduction or elimination of human error, cost reduction, and enhanced control and management of operations. Regarding the latter point, with increasing levels of automation, an onsite driller, e.g., can be less concerned with managing operation of drilling equipment and more concerned with managing the construction process and quality of a wellbore.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

As previously stated, statistics based and AI based automated solutions that can be used to manage and control well site operations are increasing in demand as the oil and gas industry moves away from expensive and dangerous manual management and control of well site operations. However, a significant issue and, therefore, a major hindrance in automating these types of operations is the lack of a standardized library that can be used by statistics based or AI based algorithmic models to determine how to control well site operations equipment based on well site operation data variables. The number of data variables required in order to accurately manage and control well site operations can be exceedingly large. The number of data variables needed, e.g., to determine how to manage and control a drilling operation can be hundreds of thousands if not millions of data variables. Another significant issue, therefore, relates to how to efficiently process the data variables in order to determine how to manage and control well site operations without effecting accuracy.

Presented here is an apparatus and system used to provide preprocessed data variables to a predictive engine. Predictive results generated from the predictive engine are used to guide well site operations. The apparatus comprises an analysis module and a pattern recognition module. The analysis module can identify a well site operation, by examining at least one well site operation variable, determine at least one semantic category and a standard operating procedure associated with the at least one semantic category using the well site operation and a-priori information, and search a library of historical information using the at least one semantic category. The historical information comprises classified procedures and recommendations of historic well site operations. The pattern recognition module can identify at least one pattern using a statistics based algorithm. The statistics based algorithm uses the standard operating procedure, the at least one semantic category and the classified procedures and recommendations. The at least one pattern indicating a deviation in the standard operating procedure.

In an embodiment, the apparatus and system can comprise a crowdsourcing module to generate procedures and recommendation variables for historic well site operations. The apparatus and system can comprise a library module. The library module can receive well site operation variables. Each well site operation variable can comprise a parameter identifying a well site operation and a value identifying actual operational detail. The library module can classify the well site operation variables based on the well site operation into semantic categories and semantic sub-categories and store the classified well site operation variables. The apparatus and system can comprise a predictive engine interface module. The predictive engine interface module can generate at least one pattern recognition variable comprising the at least one pattern. The at least one pattern is used by a predictive engine to generate a control variable used to guide the well site operation.

In another embodiment, the analysis module can identify at least one risk factor by examining at least one other well site operation variable. In addition, the predictive engine interface module can generate at least one risk factor variable. The at least one risk factor used to manage use of the control variable. Furthermore, the analysis module can identify at least one risk factor by examining at least one other well site operation variable. The pattern recognition module can identify at least one other pattern using another statistics based algorithm. The other statistics based algorithm can use the standard operating procedure, the at least one semantic category, the cataloged procedures and recommendations, and the at least one risk factor. The at least one other pattern indicating historical knowledge the at least one risk factor has on the standard operating procedure.

In yet another embodiment, the predictive engine interface module can generate at least one risk factor variable. The at least one risk factor used to manage use of the control variable. The pattern recognition module can use cluster analysis to identify the patterns. Furthermore, the analysis module can determine at least one semantic sub-category of the at least one semantic category. The analysis module can also search the library of historical information using the at least one semantic category and the at least one semantic sub-category.

In still yet another embodiment, the pattern recognition module can also identify at least one other pattern using another statistics based algorithm. The other statistics based algorithm uses the standard operating procedure, the at least one semantic category, the at least one semantic sub-category, the cataloged procedures and recommendations. The at least one other pattern indicating a deviation in the standard operating procedure.

Also presented herein is a method used to provide pre-processed data variables to a predictive engine. Predictive results from the predictive engine are used to guide well site operations. The method includes: identifying a well site operation by examining at least one well site operation variable; determining at least one semantic category and a standard operating procedure associated with the at least one semantic category using the well site operation and a-priori information; searching a library of historical information using the at least one semantic category; and identifying at least one pattern using a statistics based algorithm. The historical information can comprise classified procedures and recommendations of historic well site operations. The statistics based algorithm can use the standard operating procedure, the at least one semantic category, and the cataloged procedures and recommendations. The at least one pattern indicating a deviation in the standard operating procedure.

In an embodiment, the method further includes generating procedures and recommendation variables from historic well site operations. The method also includes: receiving well site operation variables, each well site operation variable comprising a parameter identifying a well site operation and a value identifying actual operational detail; classifying the well site operation variables based on the well site operation into semantic categories and semantic sub-categories; and storing the classified well site operation variables. Additionally, the method can include generating at least one pattern recognition variable comprising the at least one pattern, the at least one pattern used by a predictive engine to generate a control variable used to guide the well site operation. Furthermore, the method can include identifying at least one risk factor by examining at least one other well site operation variable; and generating at least one risk factor variable. The at least one risk factor can be used to manage use of the control variable. The method can also include: identifying at least one risk factor by examining at least one other well site operation variable; identifying at least one other pattern using another statistics based algorithm, the other statistics based algorithm using the standard operating procedure, the at least one semantic category, the cataloged procedures and recommendations, and the at least one risk factor. The at least one other pattern indicating historical knowledge the at least one risk factor has on the standard operating procedure. The method also includes generating at least one risk factor variable, the at least one risk factor used to manage use of the control variable.

Figure 1:
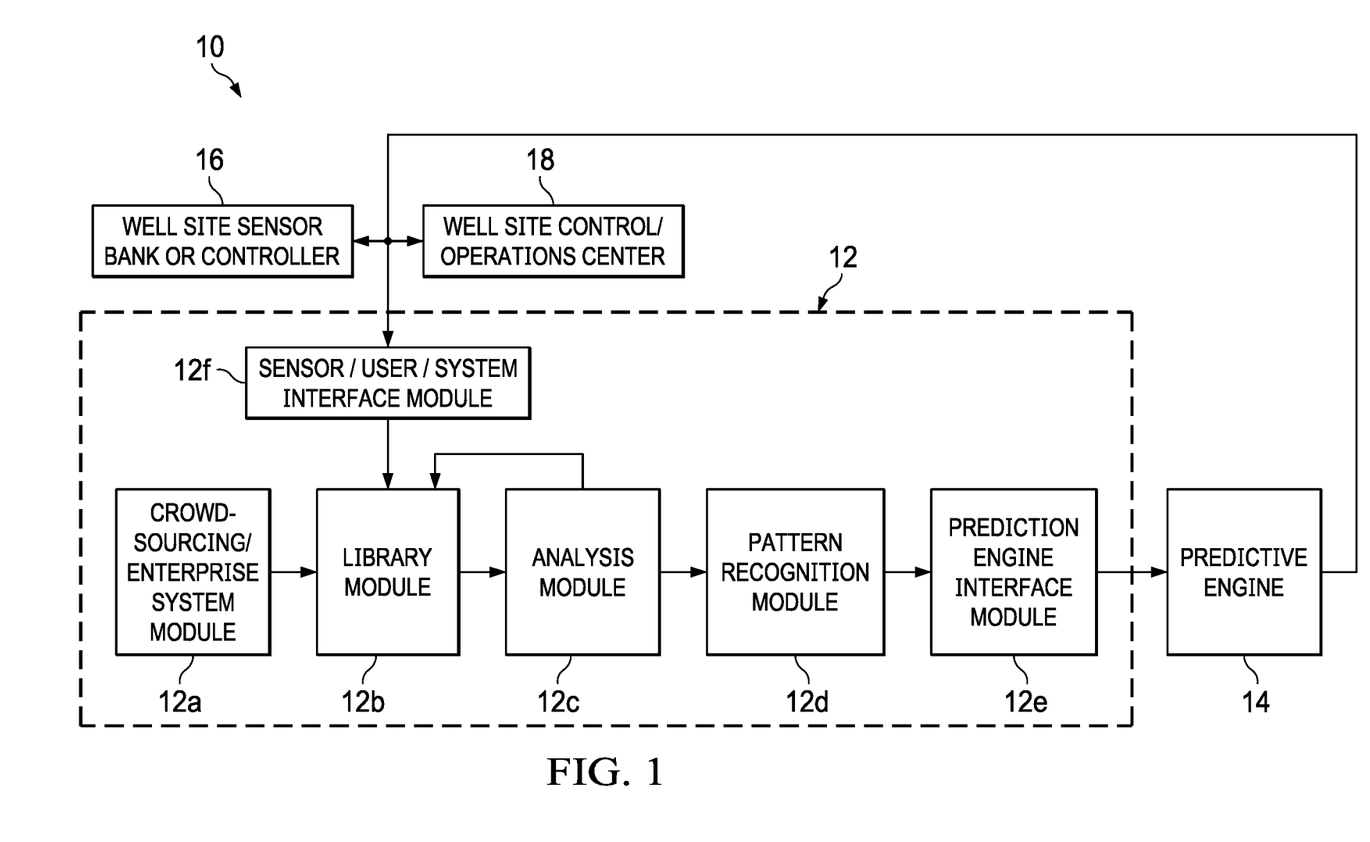
FIG. 1 is an illustration of a block diagram of a system for a data preprocessing module used to improve predictive engine accuracy and control management of well site operations, in accordance with certain example embodiments.

Referring now to FIG. 1, illustrated is a block diagram of a system for a data preprocessing module used to improve predictive engine accuracy and control management of well site operations, according to certain example embodiments, denoted generally as 10. The system 10 comprises a data preprocessing module 12, a predictive engine 14, a well site sensor bank and controller 16, and a well site control and operations center 18. The data preprocessing module 12 comprises a crowd-sourcing, personnel, and enterprise system module 12a, a library module 12b, an analysis module 12c, a pattern recognition module 12d, a predictive engine interface module 12e, and a sensor, user, and system interface module 12f.

In practice, the system 10 can generate an instance of a well site operation, an instance of a well site operation procedure, which is a sub-operation of the well site operation, a predictive result or results for the instance or instance, and a quality assessment of the predictive result or results based on defined criteria or criterion and sourced information. As an example, a well site operation could be a drilling operation for particular equipment for a particular location and a well site procedure could be a formation packing operation or formation perforation operation associated with the drilling operation. Stated differently, a well site operation can be, as an example, a combination of a well state and a rig state, such as low pressure zone and tripping or hard stringers and on bottom, drilling, circulating, and the well site operation procedure can be, as an example, tag bottom, break gels, drill a stand, or trip a stand, or any combination thereof. The instance in this case is an instantiation that includes structured details of the operation, procedure, or both. In addition, the system 10 can create a standardized library of historical instances, predictive results, and associated information and analysis. Statistical techniques, such as machine learning based statistical techniques, can be used to generate collection of relevant data variables in response to subsequent instantiations. The collection of data variables can be used to generate new predictive results used in the automated control well site operation equipment.

The crowd-sourcing, personnel, and enterprise system module 12a is used to process sourced information. The sourced information can be used to provide information that enhances stored, historical instantiated data variables and assess, comment, modify, or any combination thereof of the quality of stored, predictive results. The crowd-sourcing, personnel, and enterprise system module 12a can be notified automatically when there is an update to a crowd-sourcing, personnel, and enterprise system source. The crowd-sourcing, personnel, and enterprise system module 12a can use a web bot to search crowd-sourcing, personnel, and enterprise system sources. The web bot can be triggered automatically based on an update to the library module 12b, periodically based on a set date and time, or manually.

The well site sensor bank and controller 16 and well site control and operations center 18 are communicable coupled together and each is coupled to the data preprocessing module 12 through the sensor, user, and system interface module 12f. The well site sensor bank and controller 16 can comprise a logic controller communicable coupled with well site equipment, such as drilling rig equipment. In addition, the well site sensor bank and controller can be Industrial Internet of Things (IIOT) based controllers and sensors. In this particular embodiment, the IIOT based logic controllers are directly coupled to the sensors and the IIOT based logic controllers and sensors are directly coupled to the well site equipment, the well site control and operations center 18, and the data processing module 12. An advantage of using IIOT based controllers and sensors is the elimination of data concentrations points, which can introduce processing and communications latency.

The well site sensor bank and controller 16 can be communicable coupled to the well site control and operations center 18 and the data preprocessing module 12 using a highly efficient, low latency processing and communication system to send and receive high volume, high velocity data variables in real-time. Variables from the well site sensor bank 16 and well site control and operations center 18 can be automatically pushed to the sensor, user, and system interface module 12f. The sensor, user, and system interface module 12f can automatically notify the library module 12b upon receiving a data variable, e.g. when a well site operation begins.

The data variables can comprise well site operation variables that identify a well site, a well site operation, a well site operation procedure, a predictive result, and a predictive result accuracy. The data variables can comprise an operating procedure variable that identifies a standard operating procedure or a deviated operating procedure. The data variables can include equipment sensor variables that identify equipment and provide equipment performance status. The data variables can comprise control variables that identify equipment and equipment control information. The equipment control information comprises information used to control operation of well site equipment, such as operation of a downhole drill. The equipment control information is based on a predictive result or results generated by the predictive engine 14. The data variables can comprise known risk variables that identify known risks of a well site operation or well site operation procedure. The data variables can comprise predictive result variables that identify predictive results. The data variables can comprise predictive accuracy variables that identify a predictive result and accuracy of the predictive result. The data variables can comprise input from various sources. The input can include review or quality assessments, as an example, from crowd sourced user input, equipment identifiers from an enterprise data system, and input from SME's.

The data variables can be communicated from sensor, user, and system interface module 12f and the crowd sourcing, personnel, and enterprise system module 12a to the library module 12b. Control variables can be communicated directly from the predictive engine 14 to the well site sensor bank and controller 16. The predictive engine 14 can be communicable coupled to the well site sensor bank and controller 16 using a highly efficient, low latency processing and communication system to send and receive high volume, high velocity data variables in real-time. Control variables can be communicated directly from the well site operations and control center 18. Personnel can review and modify sensor variables, control variables, and predictive results before releasing information used to control monitored equipment.

The library module 12b determines a class of the data variables based on defined categories and sub-categories. The categories and sub-categories can be defined according to at least one selected from a group comprising a well site operation, standard industry (best) practice for the well site operation, actual practice for the well site operation, deviated practice for the well site operation, a well site operation procedure, standard industry (best) practice for the well site procedure, actual practice for the well site operation procedure, deviated practice for the well site operation procedure equipment identification, equipment performance status, known risk factor, a predictive result, accuracy of a predictive result, estimated cost of an operation, estimated cost of a procedure, actual cost of an operation, actual cost of a procedure, wellbore development production time, wellbore non-production time, estimated wellbore production, actual wellbore production, crowd-sourcing information, performance or performances of the well site operation, input or knowledge from user input, Subject Matter Experts (SMEs), input from enterprise systems, strength of relationships between entries. Classified variables are then stored based on the categories and sub-categories for scoring, indexing, and searching. It should be understood that the number of variables stored can be considered Big Data. Big Data can comprise millions of rows, columns, or both of variable parameters, values, or both.

The well site operation, standard industry (best) practice for the well site operation, actual practice for the well site operation, deviated practice for the well site operation, a well site operation procedure, standard industry (best) practice for the well site procedure, actual practice for the well site operation procedure, deviated practice for the well site operation procedure, equipment identification, equipment performance status, estimated cost of an operation, estimated cost of a procedure, actual cost of an operation, actual cost of a procedure, crowd-sourcing information, performance or performances of the well site operation, input or knowledge from user input, Subject Matter Experts (SMEs), known risk factors, and input from enterprise systems can be scored based on accuracy of the predictive results, quality assessment of classified variables based on sourced input, or both.

The analysis module 12c can include a scoring component. The analysis module 12c can evaluate at least one of the classified entries in the library module 12b and provide a ranking based on accuracy of the predictive results, quality assessment, or both. In essence, the analysis module 12c introduces a ranking of the classified entries that can be used by the pattern recognition module 12d. The pattern recognition module 12d uses an instantiated operation, procedure, or both to create a collection of historical references that are relevant to the operation, procedure, or both. The collection of references can be used by the predictive engine 14 to generate a more accurate predictive result for the instantiated well site operation and procedure.

In practice, the library module 12b and the analysis module 12c continuously execute to create the classified entries and scores through the duration of a well site operation. The library module 12b, the analysis module 12c, or both can be triggered to create classified entries and scores based on an elapsed time period, entry additions or entry updates based on sourced information, or manually. The analysis module 12c can create an array of indexes and sub-indexes in response to, e.g., instantiation of a well site operation, a well site operation procedure, and equipment status information. The analysis module 12c can be triggered to create an array, e.g., using event notifications that are based on an update to the library module 12b or select updates to the library module 12b. Additionally, the analysis module 12c can be triggered to search the library module 12b based on an elapsed time period, status updates to specific equipment, or manually.

The array can identify an instantiated well site operation or a instantiated well site operation and well site operation procedure and other historical well site operations and well site operation procedures that have similar characteristics by searching the library module 12b for classified variables stored under the defined categories and sub-categories. However, the array does not need to depend on a well site operation or well site operation procedure. In other words, the array can include an equipment identifier, e.g., where the array entries are not based on any particular operation or procedure but rather performance status of the equipment. Additionally, although in practice two particular well site operations may be different, a sub-category or categories may be similar. The analysis module 12c can be configured to create an array or add to the array if two categories, whether the same or different, have at least one similar sub-category. Obviously, entries having a strength of relationships between entries or strengths of relationships between entries can be used to streamline the process of creating an array. It should be understood and will be discussed below that a requirement for a degree of strength of relationship may be different for different entries. This can be dependent upon the entries and the criteria or criterion.

The pattern recognition module 12d uses statistical analysis, such as AI based machine learning statistical techniques, to process the array. Cluster analysis can be performed on the array to identify strength of relationships between the classified entries. The pattern recognition module 12d can quantify the strengths between classified entries based on a defined criteria or criterion.

As an example, the pattern recognition module 12d can create a cluster of data variables by performing cluster analysis on at least one selected from a group comprising standard industry (best) practice for a well site operation, standard industry (best) practice for a well site operation procedure, actual practice for the well site operation, actual practice for the well site operation procedure, deviated practice for the well site operation, deviated practice for the well site operation procedure, estimated costs, actual costs, known risk factors, wellbore development production time, wellbore non-production time, estimated wellbore production, actual wellbore production, historical and comparable wellbore production, equipment performance status, quality of crowd-sourcing information, performance or performances of any of the well site operation and procedures; quality of input or knowledge from user input, quality of Subject Matter Experts (SME), and quality of input from enterprise systems.

The pattern recognition module 12d can be set to filter the clustered result based on a criteria, such as a required prediction accuracy level, quality level, known risk factors, or any combination thereof. As previously stated, the stored, classified entries can comprises millions of rows, columns, or both of data variables. As such, the analysis module 12c can be configured to sample the stored entries to create the array as opposed to performing an entire search of the stored entries. Furthermore, the entries having a strength of relationships between entries or strengths of relationships can reduce the processing resources and time needed to create the cluster.

The predictive engine interface module 12e is configured to communicable couple the filtered, clustered results to the predictive engine 14. The predictive engine interface module 12e can automatically communicate the filtered, clustered results to the predictive engine 14 or can be triggered to communicate the filtered, clustered results to the predictive engine 14. It should be understood that in practice the predictive engine 14 may be integrated as a software module of the data preprocessing module 12, i.e. a component part of the data preprocessing module 12 accessible over a local loop, or accessible over a networked connection. The predictive engine 14 can be any $3^{rd}$ part software solution configured to perform complex, predictive analysis on the filtered, clustered results. The data preprocessing module 12, the predictive engine 14, or both can be executable in a distributed computing environment. The predictive engine 14 uses AI based algorithmic models to build a sensitivity data model of a multidimensional response to input variables from the data preprocessing module 12. As an example, the input variables from the data preprocessing module 12 can include an objective variable, such as to increase in ROP (Rate of Penetration), decrease MSE (Mechanical Specific Energy) or to stabilize downhole cleaning. The predictive engine 14 can then use the sensitivity model to determine optimal parameters and values to be to be used to control machinery to achieve the desired outcome.

Figure 2:
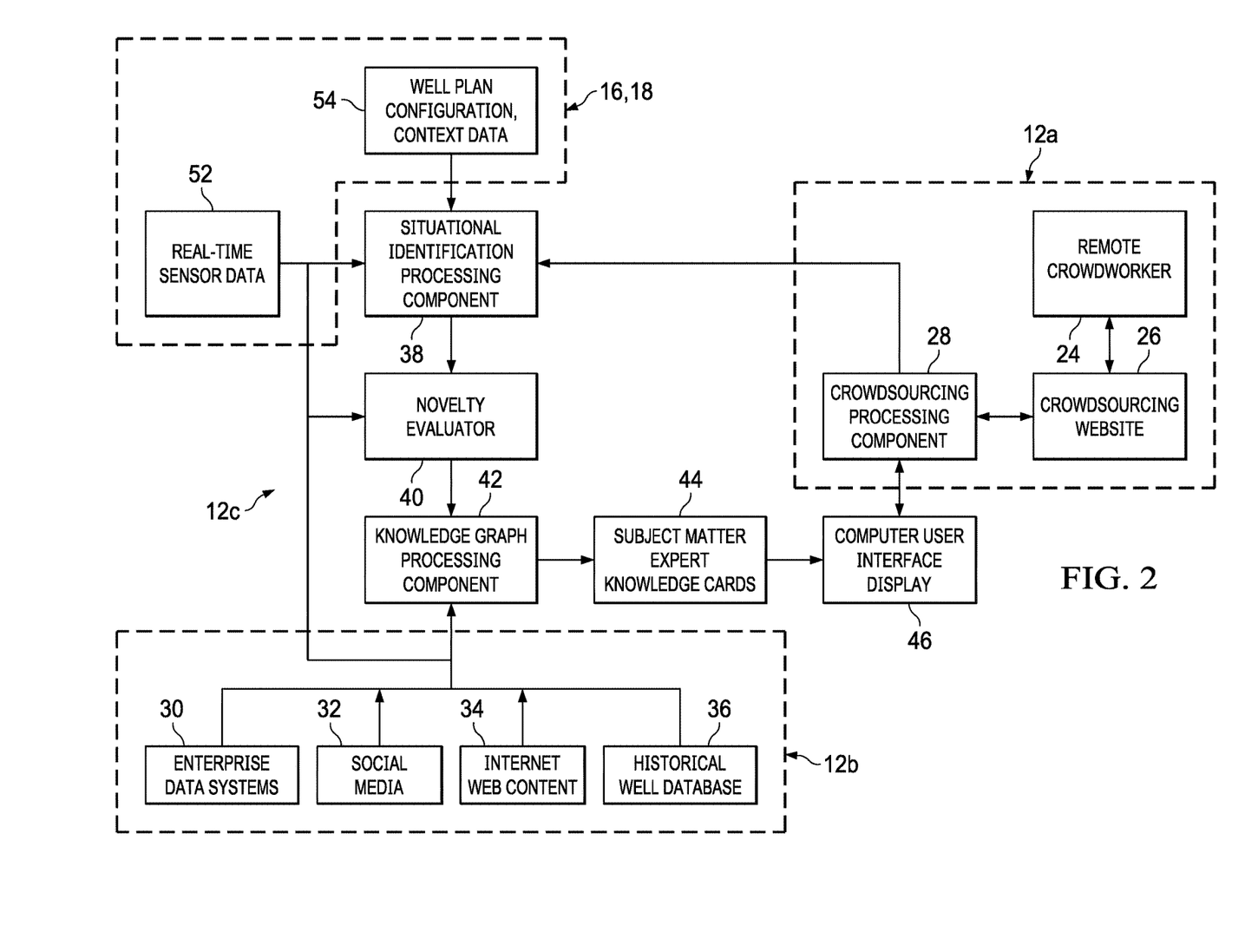
FIG. 2 is an illustration of a flow diagram of an algorithm for performing functional features of a crowd-sourcing module, a library module, an analysis module, and a sensor, user, and system interface module of the of the data preprocessing module, in accordance with certain example embodiments.

Referring now to FIG. 2, illustrated is a flow diagram of an algorithm for performing functional features of the crowd-sourcing module 12a, the library module 12b, the analysis module 12c, and the sensor, user, and system interface module 12f of the data preprocessing module 12, according to certain example embodiments. The algorithm comprises features of the crowd-sourcing module 12a, the library module 12b, the analysis module 12c, and sensor, user, and system interface module 12f capable of performing the various tasks described below.

The crowd-sourcing module 12a comprises processing procedures to collect and process data from a crowd-sourcing website 26 using a crowd-sourcing processing unit 28. The library module 12b comprises processing procedures to store and manage data from at least one enterprise data system 30, social media 32, the Internet 34, and historical well site database or databases 36. The analysis module 12c comprises processing procedures for a situational identification-processing component 38, a novelty evaluator component 40, knowledge graph processing component 42, Subject Matter Expert (SME) knowledge component 44, and a user interface display component 46. The sensor, user, and system interface module 12f comprises processing procedures to collect real-time sensor data 52 and well plan, configuration, and context data 54.

The algorithm, in essence, evaluates an instantiated wellbore operation, procedure, or both, or any classified entry to determine a collection of relevant data variables that can be used by an SME or SME's to refine. The instantiated wellbore operation, procedure, or both, or any instantiated classified entry and the relevant collection of data can be provided to the pattern recognition module 12 for further processing. In addition, the refined instantiated wellbore operation, procedure, or both, or any classified entry can be provided to the pattern recognition module 12 for further processing. The SME or SME's can be considered the arbiter of a particular instantiation. The SME or SME's can resolve any identified issues or problems in the instantiation, collection of relevant data variables, or both, or the any instantiated classified entry and collection of relevant data variables. The SME or SME's can also modify or add to the instantiation, collection of relevant data variables, or both, or the any instantiated classified entry and collection of relevant data variables.

The algorithm begins at the situational identification component 38. The situational identification component 38 identifies an instantiated well site operation, a well site operation procedure, or both, or any other instantiated entry and groups the instantiation with a collection of relevant input data for further processing. The situational identification component 38 processes input data that includes data variables from the crowd-sourcing module 12a, the library module 12b, and the well site sensor bank 16 and the well site control and operations center 18. The data variables can include crowdsourcing data, well plan, configuration, and context data, sensor data, and historical data received from a crowdsourcing processing component 28, received at a crowdsourcing website 26 from a remote crowdsourcing user, historical data, a well plan, configuration, and context data component 54, and a sensor data component 52. The historical data is received from an enterprise data system component 30, social media component 32, Internet web content component 34, and well database component 36.

The algorithm continues at a novelty evaluator component 40. The novelty evaluator component 40 determines a uniqueness of the instantiated well site operation, a well site operation procedure, or both, or any other instantiated entry and the collection of relevant data. The novelty evaluator scores the uniqueness of the instantiation by evaluating similarities between the collection of relevant data and the instantiation. The score can be determined based on a threshold value, e.g. 2000 similar features between the collection and the instantiation. Comparisons that do not meet a defined threshold are not considered for further processing. Stated differently, if the size of the collection does not meet a minimal threshold, the instantiation and relevant data are not considered for further processing.

The algorithm continues at the knowledge graph processing component 42. The knowledge graph processing component 42 processes qualified instantiations and the collection of relevant data. The knowledge graph processing component 42 evaluates the qualified instantiation and the collection of relevant data and, optionally, identifies an SME or SME's. As an example, the enterprise data system 30 or the social media component 32 can be used to identify an SME or SME's based on keywords associated with an instantiation, collection of relevant data, or both. The SME or SME's can be associated with a subject matter expert knowledge card or cards 44. The knowledge card or cards 44 can be pushed, or otherwise made available, to each SME through the crowd-sourcing module 12a. Obviously, the cards can be a type of network communications message, such as email. As previously stated, the SME or SME's input is optional. However, the SME or SME's can make modifications to the collection of relevant data or simply add additional information.

Figure 3:
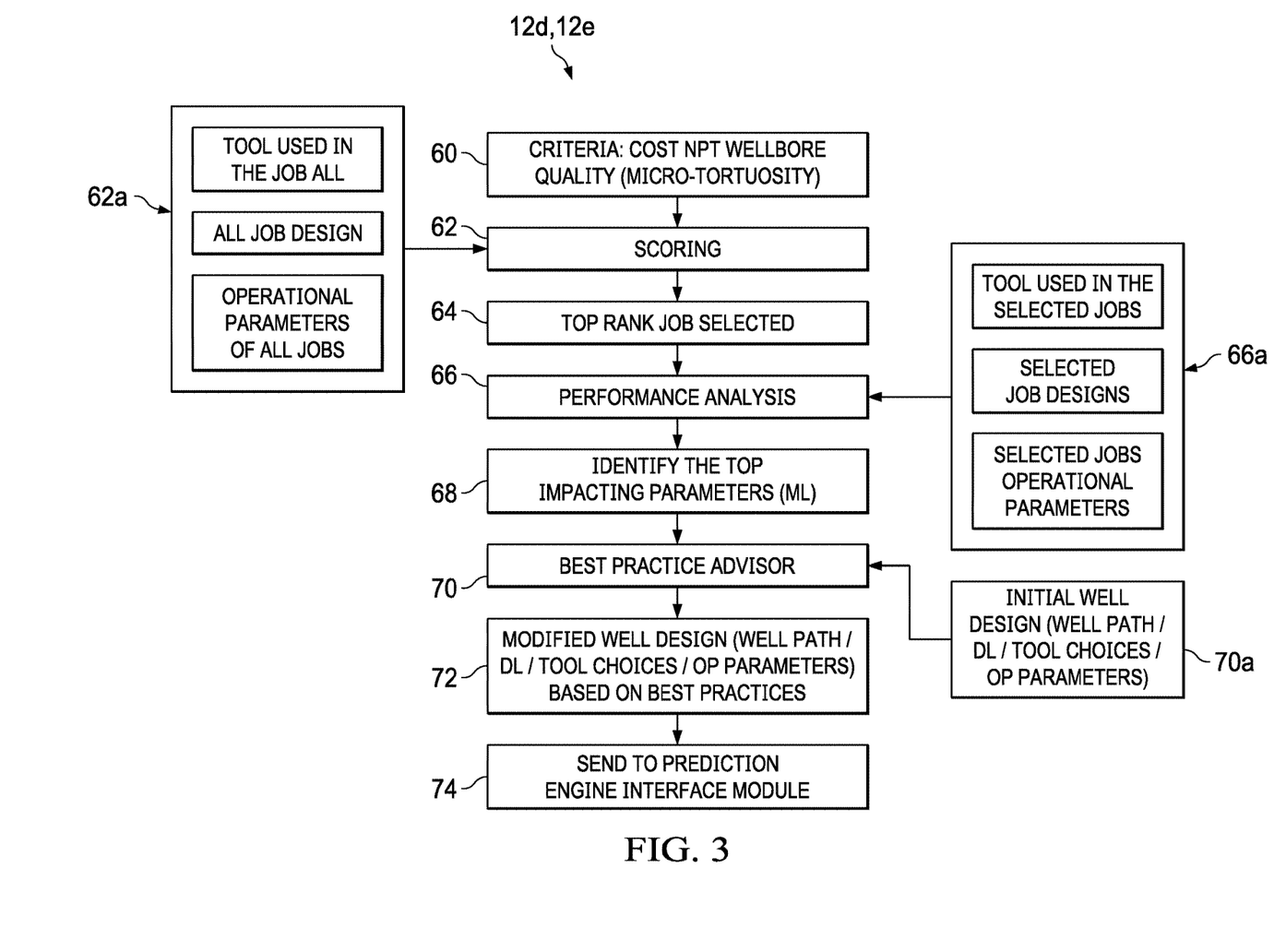
FIG. 3 is an illustration of a flow diagram of another algorithm for performing functional features of the analysis module, pattern recognition module, and the predictive engine interface module of the data preprocessing module, in accordance with certain example embodiments.

Referring now to FIG. 3, illustrated is a flow diagram of another algorithm for performing functional features of the analysis module 12c, pattern recognition module 12d and the predictive engine interface module 12e of the data preprocessing module 12, according to certain example embodiments. The algorithm comprises executable processing procedures for a wellbore-variable criteria component 60, a scoring component 62, a job(s) selection component 64, a performance analysis component 66, an impacting parameters component 68, a best practice advisor component 70, an initial well design component 70a, a modified well design component 72, and a predictive engine communications component 74.

The algorithm begins at the wellbore-variable and criteria component 60. The wellbore-variable and criteria component 60 evaluates the qualified instantiation, the collection of relevant data, or the SME or SME's refined qualified instantiation and collection of relevant data, and identifies a criteria or criterion. The algorithm continues at the scoring component 62. The scoring component 52 ranks the collection of relevant data, or the SME or SME's refined collection of relevant data, using the identified criteria or criterion. Statistical analysis, such as an AI based machine learning techniques or techniques, can be used to rank the collection of relevant data, or the SME or SME's refined qualified instantiation and collection of relevant data, using the identified criteria or criterion. As an example, cluster analysis can be used to rank the collection of relevant data based on the criteria or criterion selected. Stated differently, cluster analysis can be used to rank the collection of relevant data variables based on the criteria or criterion selected. The algorithm continues at the job(s) selection component 64. Job as used herein is in reference to any of the classified entries previously mentioned. The jobs that rank within a predefined threshold can be selected for further processing. The algorithm continues at the performance analysis component 66. The performance analysis component 66 uses statistical analysis, such as an AI based machine learning techniques or techniques, on the data variables associated with the job or jobs to identify strength of relationships between the qualified instantiation, the collection of relevant data, or the SME or SME's refined qualified instantiation and collection of relevant data. The algorithm continues at the impacting parameters component 68. Based on the data variables evaluated, the impacting parameters component can reference a value based index that identifies a predefined threshold. The predefined threshold can be used to identify the top impacting variables. The algorithm continues at the best advisor component 60. The best advisor component 60 identifies the predictive engine 14 based on the qualified instantiation and configures a communications message to include the address of the predictive engine 14 and the top impacting variables. The algorithm continues at the predictive engine communications component 64 where the communications message is processed and send to the predictive engine 14.

It should be understood that depending on parameter space of data variables being processed, either statistical analysis or machine learning based statistical analysis can be used to identify variables having common characteristics and to determine strength of relationships between those variables. If the number of variables being considered for analysis are not considered Big Data and can be statistical processed within an acceptable time frame with reasonable computational resources, the use of machine learning based statistical techniques may not be needed. The use of machine learning based statistical techniques is subjective and can be set based on a predefined threshold. Stated different, the system 10 can be configured to employ the use of machine learning based statistical techniques if the data variables stored in the library module exceeds a certain threshold or if collected, relevant data variables exceed a certain threshold.

Figure 4:
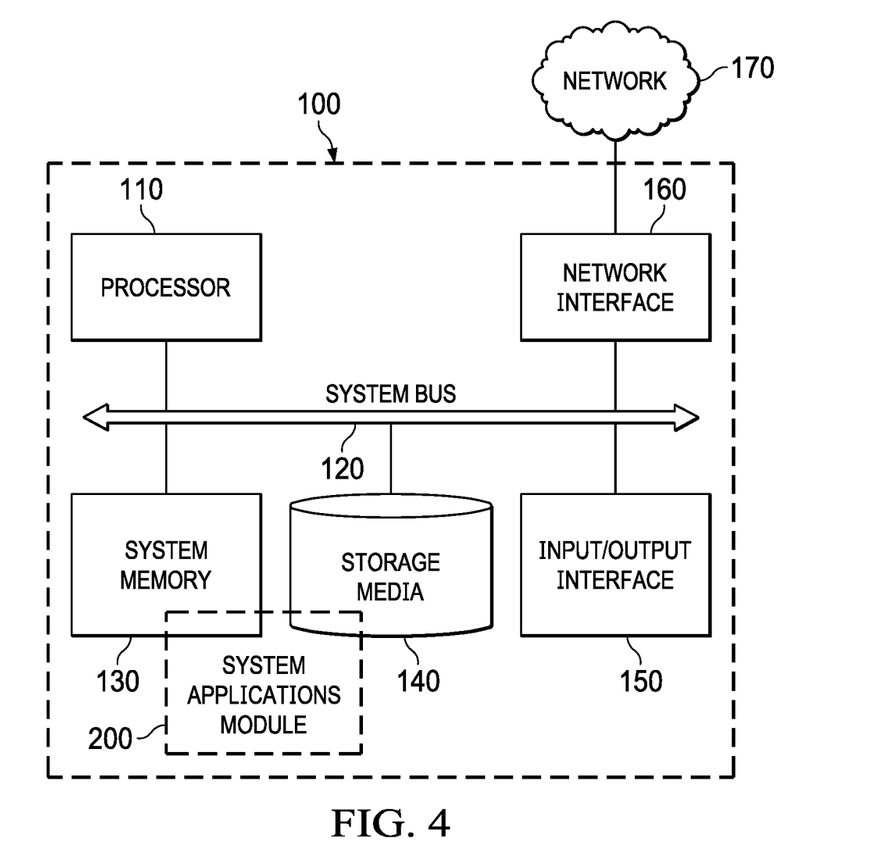
FIG. 4 is an illustration of a diagram of a computing machine and a system applications module, in accordance with certain example embodiments.

Referring now to FIG. 4, illustrated is a computing machine 200 and a system applications module 300, in accordance with example embodiments. The computing machine 300 can correspond to any of the various computers, mobile devices, laptop computers, servers, embedded systems, or computing systems presented herein. The module 300 can comprise one or more hardware or software elements designed to facilitate the computing machine 200 in performing the various methods and processing functions presented herein. The computing machine 200 can include various internal or attached components such as a processor 210, system bus 220, system memory 230, storage media 240, input/output interface 250, a network interface 260 for communicating with a network 270, e.g. a loopback, local network, wide-area network, cellular/GPS, Bluetooth, WIFI, and WIMAX, and sensors 280.

The computing machine 200 can be implemented as a conventional computer system, an embedded controller, a laptop, a server, a mobile device, a smartphone, a wearable computer, a customized machine, any other hardware platform, or any combination or multiplicity thereof. The computing machine 200 and associated logic and modules can be a distributed system configured to function using multiple computing machines interconnected via a data network and/or bus system.

The processor 210 can be designed to execute code instructions in order to perform the operations and functionality described herein, manage request flow and address mappings, and to perform calculations and generate commands. The processor 210 can be configured to monitor and control the operation of the components in the computing machines. The processor 210 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 210 can be a single processing unit, multiple processing units, a single processing core, multiple processing cores, special purpose processing cores, co-processors, or any combination thereof. According to certain embodiments, the processor 210 along with other components of the computing machine 200 can be a software based or hardware based virtualized computing machine executing within one or more other computing machines.

The system memory 230 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 230 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 230. The system memory 230 can be implemented using a single memory module or multiple memory modules. While the system memory 230 is depicted as being part of the computing machine, one skilled in the art will recognize that the system memory 230 can be separate from the computing machine 200 without departing from the scope of the subject technology. It should also be appreciated that the system memory 230 can include, or operate in conjunction with, a non-volatile storage device such as the storage media 240.

The storage media 240 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 240 can store one or more operating systems, application programs and program modules, data, or any other information. The storage media 240 can be part of, or connected to, the computing machine. The storage media 240 can also be part of one or more other computing machines that are in communication with the computing machine such as servers, database servers, cloud storage, network attached storage, and so forth.

The applications module 300 can comprise one or more hardware or software elements configured to facilitate the computing machine with performing the various methods and processing functions presented herein. The applications module 300 can include one or more algorithms or sequences of instructions stored as software or firmware in association with the system memory 230, the storage media 240 or both. The storage media 240 can therefore represent examples of machine or computer readable media on which instructions or code can be stored for execution by the processor 210. Machine or computer readable media can generally refer to any medium or media used to provide instructions to the processor 210. Such machine or computer readable media associated with the applications module 300 can comprise a computer software product. It should be appreciated that a computer software product comprising the applications module 300 can also be associated with one or more processes or methods for delivering the applications module 300 to the computing machine 200 via a network, any signal-bearing medium, or any other communication or delivery technology. The applications module 300 can also comprise hardware circuits or information for configuring hardware circuits such as microcode or configuration information for an FPGA or other PLD. In one exemplary embodiment, applications module 200 can include algorithms capable of performing the functional operations described by the flow charts and computer systems presented herein.

The input/output ("I/O") interface 250 can be configured to couple to one or more external devices, to receive data from the one or more external devices, and to send data to the one or more external devices. Such external devices along with the various internal devices can also be known as peripheral devices. The I/O interface 250 can include both electrical and physical connections for coupling the various peripheral devices to the computing machine or the processor 210. The I/O interface 250 can be configured to communicate data, addresses, and control signals between the peripheral devices, the computing machine, or the processor 210. The I/O interface 250 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 250 can be configured to implement only one interface or bus technology. Alternatively, the I/O interface 250 can be configured to implement multiple interfaces or bus technologies. The I/O interface 250 can be configured as part of, all of, or to operate in conjunction with, the system bus 220. The I/O interface 250 can include one or more buffers for buffering transmissions between one or more external devices, internal devices, the computing machine, or the processor 220.

The I/O interface 220 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 220 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 200 can operate in a networked environment using logical connections through the network interface 260 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 210 can be connected to the other elements of the computing machine or the various peripherals discussed herein through the system bus 220. It should be appreciated that the system bus 220 can be within the processor 210, outside the processor 210, or both. According to some embodiments, any of the processors 210, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, an apparatus used to provide preprocessed data variables to a predictive engine, predictive results from the predictive engine used for guiding well site operations, the apparatus comprising: an analysis module configured by a processor to: identify a well site operation by examining at least one well site operation variable; determine at least one semantic category and a standard operating procedure associated with the at least one semantic category using the well site operation and a-priori information; search a library of historical information using the at least one semantic category, the historical information comprising classified procedures and recommendations of historic well site operations; and a pattern recognition module configured by the processor to identify at least one pattern using a statistics based algorithm, the statistics based algorithm using the standard operating procedure, the at least one semantic category, the classified procedures and recommendations, the at least one pattern indicating a deviation in the standard operating procedure;

Clause 2, the apparatus of clause 1, further comprising a crowdsourcing module configured by the processor to generate procedures and recommendation variables for historic well site operations;

Clause 3, the apparatus of clause 1, further comprising: a library module configured by the processor to: receive well site operation variables, each well site operation variable comprising a parameter identifying a well site operation and a value identifying actual operational detail; classify the well site operation variables based on the well site operation into semantic categories and semantic sub-categories; and store the classified well site operation variables;

Clause 4, the apparatus of clause 1, further comprising a predictive engine interface module configured by the processor to generate at least one pattern recognition variable comprising the at least one pattern, the at least one pattern used by a predictive engine to generate a control variable used to guide the well site operation;

Clause 5, the apparatus of clause 4, further comprising: the analysis module further configured by the processor to identify at least one risk factor by examining at least one other well site operation variable; and the predictive engine interface module further configured by the processor to generate at least one risk factor variable, the at least one risk factor used to manage use of the control variable;

Clause 6, the apparatus of clause 1, further comprising: the analysis module further configured by the processor to identify at least one risk factor by examining at least one other well site operation variable; the pattern recognition module further configured by the processor to identify at least one other pattern using another statistics based algorithm, the other statistics based algorithm using the standard operating procedure, the at least one semantic category, the classified procedures and recommendations, and the at least one risk factor, the at least one other pattern indicating historical knowledge the at least one risk factor has on the standard operating procedure;

Clause 7, the apparatus of clause 6, further comprising a predictive engine interface module configured by the processor to generate at least one risk factor variable, the at least one risk factor used to manage use of the control variable;

Clause 8, the apparatus of clause 1, wherein the analysis module is further configured by the processor to determine at least one semantic sub-category of the at least one semantic category;

Clause 9, the apparatus of clause 8, wherein the analysis module is further configured by the processor to search the library of historical information using the at least one semantic category and the at least one semantic sub-category;

Clause 10, the apparatus of clause 9, wherein the pattern recognition module is further configured by the processor to identify at least one other pattern using another statistics based algorithm, the other statistics based algorithm using the standard operating procedure, the at least one semantic category, the at least one semantic sub-category, the classified procedures and recommendations, the at least one pattern indicating a deviation in the standard operating procedure;

Clause 11, the apparatus of clause 1, wherein the pattern recognition module is further configured by the processor to identify the at least one pattern using cluster analysis;

Clause 12, a system for guiding well site operations, the system comprising: a plurality of sensors used to monitor well site operations equipment; at least one controller communicable coupled to the plurality of sensors and the well site operations equipment; an analysis module configured by a processor to: identify a well site operation by examining at least one well site operation variable; determine at least one semantic category and a standard operating procedure associated with the at least one semantic category using the well site operation and a-priori information; search a library of historical information using the at least one semantic category, the historical information comprising classified procedures and recommendations of historic well site operations; and a pattern recognition module configured by the processor to identify at least one pattern using a statistics based algorithm, the statistics based algorithm using the standard operating procedure, the at least one semantic category, the classified procedures and recommendations, the at least one pattern indicating a deviation in the standard operating procedure; a predictive engine configured by a processor to: generate predictive results used for guiding well site operations based on the at least one pattern;

Clause 13, the system of clause 12, further comprising a crowdsourcing module configured by the processor to generate procedures and recommendation variables for historic well site operations;

Clause 14, the system of clause 12, further comprising: a library module configured by the processor to: receive well site operation variables, each well site operation variable comprising a parameter identifying a well site operation and a value identifying actual operational detail; classify the well site operation variables based on the well site operation into semantic categories and semantic sub-categories; and store the classified well site operation variables;

Clause 15, the system of clause 12, further comprising a predictive engine interface module configured by the processor to generate at least one pattern recognition variable comprising the at least one pattern, the at least one pattern used by a predictive engine to generate a control variable used to guide the well site operation;

Clause 16, the system of clause 15, further comprising: the analysis module further configured by the processor to identify at least one risk factor by examining at least one other well site operation variable; and the predictive engine interface module further configured by the processor to generate at least one risk factor variable, the at least one risk factor used to manage use of the control variable;

Clause 17, the system of clause 12, further comprising: the analysis module further configured by the processor to identify at least one risk factor by examining at least one other well site operation variable; the pattern recognition module further configured by the processor to identify at least one other pattern using another statistics based algorithm, the other statistics based algorithm using the standard operating procedure, the at least one semantic category, the classified procedures and recommendations, and the at least one risk factor, the at least one other pattern indicating historical knowledge the at least one risk factor has on the standard operating procedure;

Clause 18, the system of clause 17, further comprising a predictive engine interface module configured by the processor to generate at least one risk factor variable, the at least one risk factor used to manage use of the control variable;

Clause 19, the system of clause 12, wherein the analysis module is further configured by the processor to determine at least one semantic sub-category of the at least one semantic category;

Clause 20, the system of clause 19, wherein the analysis module is further configured by the processor to search the library of historical information using the at least one semantic category and the at least one semantic sub-category;

Clause 21, the system of clause 20, wherein the pattern recognition module is further configured by the processor to identify at least one other pattern using another statistics based algorithm, the other statistics based algorithm using the standard operating procedure, the at least one semantic category, the at least one semantic sub-category, the classified procedures and recommendations, the at least one pattern indicating a deviation in the standard operating procedure;

Clause 22, the system of clause 12, wherein the pattern recognition module is further configured by the processor to identify the at least one pattern using cluster analysis;

Clause 23, a method used to provide preprocessed data variables to a predictive engine, predictive results from the predictive engine used for guiding well site operations, the method comprising: identifying a well site operation by examining at least one well site operation variable; determining at least one semantic category and a standard operating procedure associated with the at least one semantic category using the well site operation and a-priori information; searching a library of historical information using the at least one semantic category, the historical information comprising classified procedures and recommendations of historic well site operations; and identifying at least one pattern using a statistics based algorithm, the statistics based algorithm using the standard operating procedure, the at least one semantic category, the classified procedures and recommendations, the at least one pattern indicating a deviation in the standard operating procedure;

Clause 24, the method of clause 23, further comprising generating procedures and recommendation variables for historic well site operations;

Clause 25, the method of clause 23, further comprising: receiving well site operation variables, each well site operation variable comprising a parameter identifying a well site operation and a value identifying actual operational detail; classifying the well site operation variables based on the well site operation into semantic categories and semantic sub-categories; and storing the classified well site operation variables;

Clause 26, the method of clause 23, further comprising generating at least one pattern recognition variable comprising the at least one pattern, the at least one pattern used by a predictive engine to generate a control variable used to guide the well site operation;

Clause 27, the method of clause 26, further comprising: identifying at least one risk factor by examining at least one other well site operation variable; and generating at least one risk factor variable, the at least one risk factor used to manage use of the control variable;

Clause 28, the method of clause 23, further comprising: identifying at least one risk factor by examining at least one other well site operation variable; identifying at least one other pattern using another statistics based algorithm, the other statistics based algorithm using the standard operating procedure, the at least one semantic category, the classified procedures and recommendations, and the at least one risk factor, the at least one other pattern indicating historical knowledge the at least one risk factor has on the standard operating procedure;

Clause 29, the method of clause 28, further comprising generating at least one risk factor variable, the at least one risk factor used to manage use of the control variable; and Clause 30, the method of clause 23, further comprising determining at least one semantic sub-category of the at least one semantic category.

What is claimed is:

1. An apparatus used to provide preprocessed data variables to a predictive engine, predictive results from the predictive engine used for guiding well site operations, the apparatus comprising:
an analysis module configured by a processor to:
identify a well site operation by examining at least one well site operation variable;

determine at least one semantic category and a standard operating procedure associated with the at least one semantic category using the well site operation;

search a library of historical information using the at least one semantic category, the historical information comprising classified procedures and recommendations of historic well site operations;

a pattern recognition module configured by the processor to identify at least one pattern using a statistics based algorithm, the statistics based algorithm using the standard operating procedure, the at least one semantic category, the classified procedures and recommendations, the at least one pattern indicating a deviation in the standard operating procedure; and a predictive engine interface module configured by the processor to generate at least one pattern recognition variable comprising the at least one pattern, to generate a control variable from the at least one pattern recognition variable, and to communicate the control variable to a well site sensor bank and controller to control the well site operation.

2. The apparatus of claim 1, further comprising a crowdsourcing module configured by the processor to generate procedures and recommendation variables for historic well site operations.

3. The apparatus of claim 1, further comprising:
a library module configured by the processor to:
receive well site operation variables, each well site operation variable comprising a parameter identifying a well site operation and a value identifying actual operational detail;
classify the well site operation variables based on the well site operation into semantic categories and semantic sub-categories; and
store the classified well site operation variables.

4. The apparatus of claim 1, further comprising:
the analysis module further configured by the processor to identify at least one risk factor by examining at least one other well site operation variable; and
the predictive engine interface module further configured by the processor to generate at least one risk factor variable, the at least one risk factor used to manage use of the control variable.

5. The apparatus of claim 1, further comprising:
the analysis module further configured by the processor to identify at least one risk factor by examining at least one other well site operation variable;
the pattern recognition module further configured by the processor to identify at least one other pattern using another statistics based algorithm, the other statistics based algorithm using the standard operating procedure, the at least one semantic category, the classified procedures and recommendations, and the at least one risk factor, the at least one other pattern indicating historical knowledge the at least one risk factor has on the standard operating procedure.

6. The apparatus of claim 5, further comprising a predictive engine interface module configured by the processor to generate at least one risk factor variable, the at least one risk factor used to manage use of the control variable.

7. The apparatus of claim 1, wherein the analysis module is further configured by the processor to determine at least one semantic sub-category of the at least one semantic category.

8. The apparatus of claim 7, wherein the analysis module is further configured by the processor to search the library of historical information using the at least one semantic category and the at least one semantic sub-category.

9. The apparatus of claim 8, wherein the pattern recognition module is further configured by the processor to identify at least one other pattern using another statistics based algorithm, the other statistics based algorithm using the standard operating procedure, the at least one semantic category, the at least one semantic sub-category, the classified procedures and recommendations, the at least one pattern indicating a deviation in the standard operating procedure.

10. The apparatus of claim 1, wherein the pattern recognition module is further configured by the processor to identify the at least one pattern using cluster analysis.

11. A system for guiding well site operations, the system comprising:
a plurality of sensors used to monitor well site operations equipment;
at least one controller communicable coupled to the plurality of sensors and the well site operations equipment;
an analysis module configured by a processor to:
identify a well site operation by examining at least one well site operation variable;
determine at least one semantic category and a standard operating procedure associated with the at least one semantic category using the well site operation;
search a library of historical information using the at least one semantic category, the historical information comprising classified procedures and recommendations of historic well site operations; and
a pattern recognition module configured by the processor to identify at least one pattern using a statistics based algorithm, the statistics based algorithm using the standard operating procedure, the at least one semantic category, the classified procedures and recommendations, the at least one pattern indicating a deviation in the standard operating procedure;
a predictive engine configured by a processor to:
generate predictive results used for guiding well site operations based on the at least one pattern,
generate at least one pattern recognition variable comprising the at least one pattern,
generate a control variable from the at least one pattern recognition variable, and
communicate the control variable to the at least one controller to control the well site operations equipment.

12. The system of claim 11, further comprising a crowdsourcing module configured by the processor to generate procedures and recommendation variables for historic well site operations.

13. The system of claim 11, further comprising:
a library module configured by the processor to:
receive well site operation variables, each well site operation variable comprising a parameter identifying a well site operation and a value identifying actual operational detail;
classify the well site operation variables based on the well site operation into semantic categories and semantic sub-categories; and
store the classified well site operation variables.

14. The system of claim 11, further comprising:
the analysis module further configured by the processor to identify at least one risk factor by examining at least one other well site operation variable; and the predictive engine interface module further configured by the processor to generate at least one risk factor variable, the at least one risk factor used to manage use of the control variable.

15. The system of claim 11, further comprising:
the analysis module further configured by the processor to identify at least one risk factor by examining at least one other well site operation variable;
the pattern recognition module further configured by the processor to identify at least one other pattern using another statistics based algorithm, the other statistics based algorithm using the standard operating procedure, the at least one semantic category, the classified procedures and recommendations, and the at least one risk factor, the at least one other pattern indicating historical knowledge the at least one risk factor has on the standard operating procedure.

16. The system of claim 15, further comprising a predictive engine interface module configured by the processor to generate at least one risk factor variable, the at least one risk factor used to manage use of the control variable.

17. The system of claim 11, wherein the analysis module is further configured by the processor to determine at least one semantic sub-category of the at least one semantic category.

18. The system of claim 17, wherein the analysis module is further configured by the processor to search the library of historical information using the at least one semantic category and the at least one semantic sub-category.

19. The system of claim 18, wherein the pattern recognition module is further configured by the processor to identify at least one other pattern using another statistics based algorithm, the other statistics based algorithm using the standard operating procedure, the at least one semantic category, the at least one semantic sub-category, the classified procedures and recommendations, the at least one pattern indicating a deviation in the standard operating procedure.

20. The system of claim 11, wherein the pattern recognition module is further configured by the processor to identify the at least one pattern using cluster analysis.

21. A method used to provide preprocessed data variables to a predictive engine, predictive results from the predictive engine used for guiding well site operations, the method comprising:
identifying a well site operation by examining at least one well site operation variable;
determining at least one semantic category and a standard operating procedure associated with the at least one semantic category using the well site operation;
searching a library of historical information using the at least one semantic category, the historical information comprising classified procedures and recommendations of historic well site operations;
identifying at least one pattern using a statistics based algorithm, the statistics based algorithm using the standard operating procedure, the at least one semantic category, the classified procedures and recommendations, the at least one pattern indicating a deviation in the standard operating procedure;
generating at least one pattern recognition variable comprising the at least one pattern;
generating a control variable from the at least one pattern recognition variable; and
communicating the control variable to a well site sensor bank and controller to control the well site operation.

22. The method of claim 21, further comprising generating procedures and recommendation variables for historic well site operations.

23. The method of claim 21, further comprising:
receiving well site operation variables, each well site operation variable comprising a parameter identifying a well site operation and a value identifying actual operational detail;
classifying the well site operation variables based on the well site operation into semantic categories and semantic sub-categories; and
storing the classified well site operation variables.

24. The method of claim 21, further comprising:
identifying at least one risk factor by examining at least one other well site operation variable; and
generating at least one risk factor variable, the at least one risk factor used to manage use of the control variable.

25. The method of claim 21, further comprising:
identifying at least one risk factor by examining at least one other well site operation variable;
identifying at least one other pattern using another statistics based algorithm, the other statistics based algorithm using the standard operating procedure, the at least one semantic category, the classified procedures and recommendations, and the at least one risk factor, the at least one other pattern indicating historical knowledge the at least one risk factor has on the standard operating procedure.

26. The method of claim 25, further comprising generating at least one risk factor variable, the at least one risk factor used to manage use of the control variable.

27. The method of claim 21, further comprising determining at least one semantic sub-category of the at least one semantic category.

* * * * *